Aug. 22, 1967  W. E. GOUDY  3,337,012
DRIVE APPARATUS INCLUDING TORQUE CONVERTER AND
FLUID OPERATED CLUTCH
Filed Oct. 22, 1965
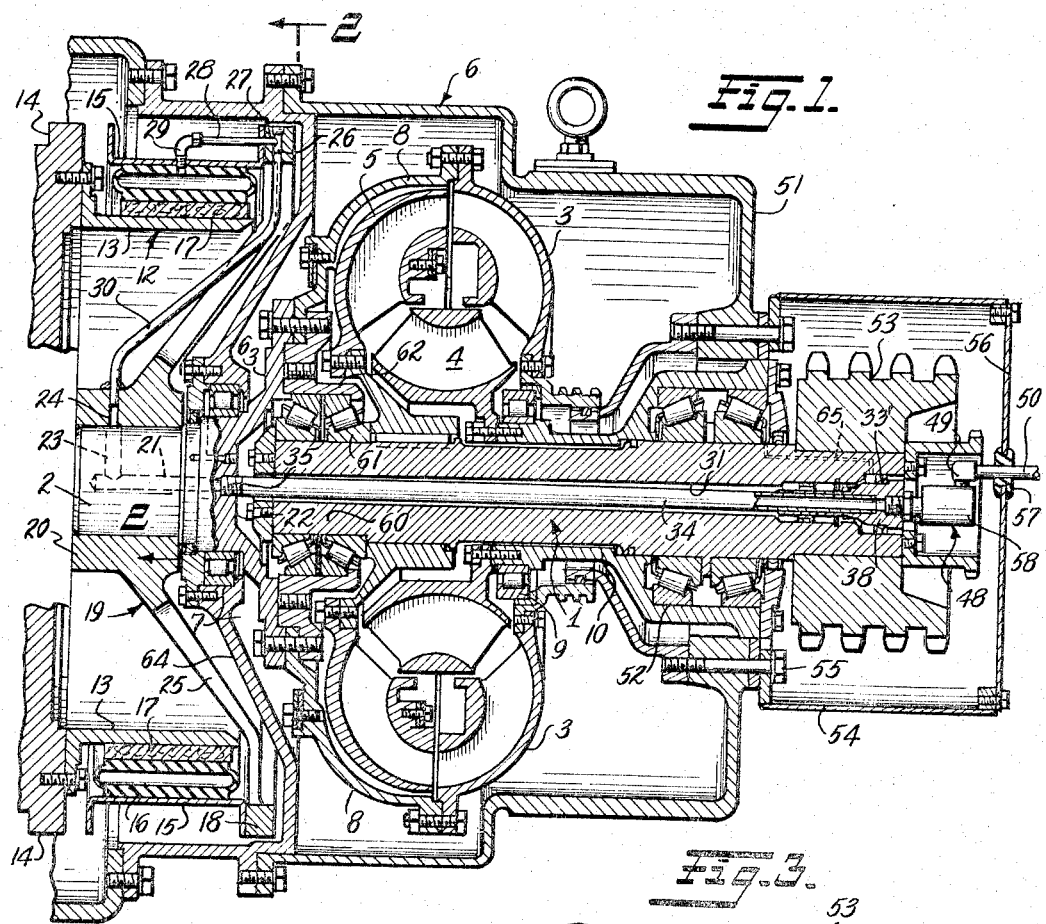
Fig.1.
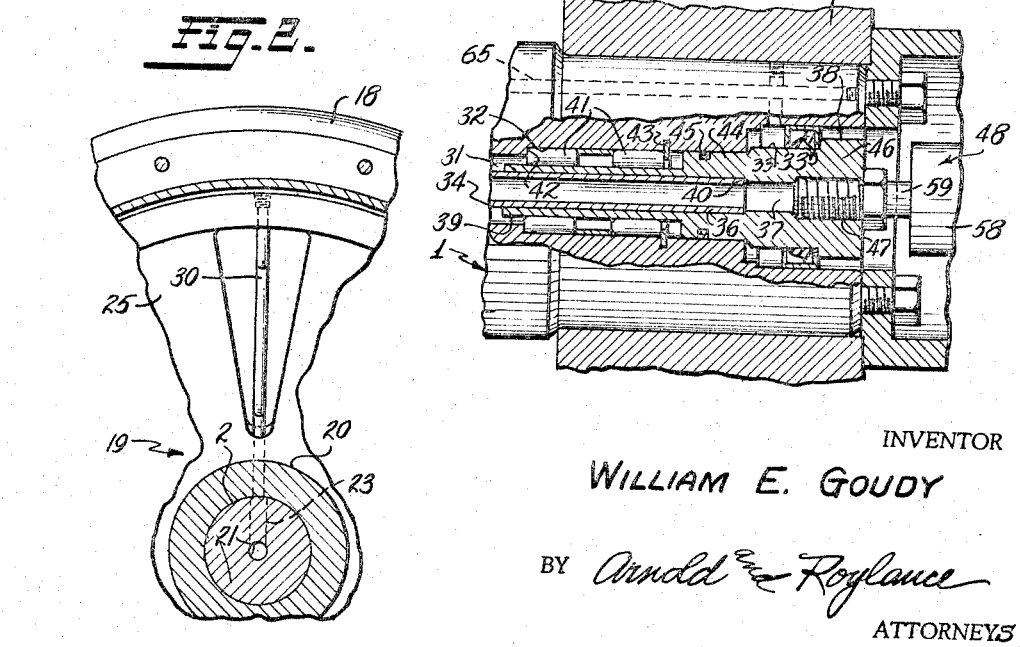
Fig.2.
Fig.3.
INVENTOR
WILLIAM E. GOUDY
BY Arnold & Roylance
ATTORNEYS

United States Patent Office 3,337,012
Patented Aug. 22, 1967

3,337,012
DRIVE APPARATUS INCLUDING TORQUE CONVERTER AND FLUID OPERATED CLUTCH
William E. Goudy, Gainesville, Tex., assignor to Armco Steel Corporation, Middletown, Ohio, a corporation of Ohio
Filed Oct. 22, 1965, Ser. No. 501,109
6 Claims. (Cl. 192—3.33)

This invention relates to drive apparatus and more particularly to such apparatus comprising a torque converter and a clutch by which the torque converter can be coupled to a rotary power device.

There are numerous applications in industry which require that heavy duty apparatus, such as a rotary well drilling rig, be driven by a powerful diesel or like engine through the combination of a torque converter and a clutch. Because of the heavy loads and correspondingly powerful engines involved, with ratings on the order of 80–2000 horsepower, it has become common practice to employ in such drive apparatus very heavy duty clutches which are operated by fluid pressure, the fluid pressure usually being applied to an inflatable clutch member which carries friction elements urged to clutch-engaged position as the clutch member is inflated. However, such clutches inherently require that pressure fluid be supplied to a point in the clutch structure that rotates during operation of the drive apparatus, and this requirement has not heretofore been completely satisfied.

It is accordingly a general object of this invention to devise a drive apparatus, comprising a torque converter and a pressure fluid operated clutch for coupling the torque converter to an engine, with simple and highly dependable means for supplying pressure fluid to operate the clutch.

Another object is to provide such an apparatus wherein the pressure fluid is conducted axially through the torque converter from the end thereof opposite the location of the clutch.

Stated broadly, the invention employs a torque converter including coaxially aligned rotary driving and driven members, one rotary member of the fluid pressure operated clutch being connected to the driving member to supply the power input to the torque converter, the driving member of the torque converter being provided with conduit means which extends axially through the driven member of the torque converter to receive pressure fluid, means also being provided to establish a passageway communicating between the conduit means and the clutch so that the pressure fluid supplied to the conduit means can operate the clutch. In a particularly advantageous embodiment of the invention, the driven member of the torque converter has an axial through bore and the conduit means is a rigid tube fixed at one end to the driving member of the torque converter and supported at its opposite end by a rotary anti-friction bearing carried by the driven member.

In order that the manner in which the foregoing and other objects are attained in accordance with the invention can be understood in detail, one particularly advantageous embodiment thereof will be described in detail with reference to the accompanying drawings, which form a part of this specification, and wherein:

FIG. 1 is an axial sectional view of a drive apparatus according to the invention;

FIG. 2 is a fragmentary transverse sectional view taken on line 2—2, FIG. 1; and FIG. 3 is an enlarged fragmentary view, mainly in axial section, of a portion of the apparatus of FIG. 1.

Turning now to the drawings in detail, the illustrated embodiment of the invention comprises a torque converter arranged to drive output shaft 1 from input shaft 2, the torque converter including an annular vaned impeller 3, an annular vaned stator 4, and an annular vaned turbine or runner 5. Input shaft 2 is rotatably supported on the stationary housing 6 by a roller bearing 7 and is rigidly secured to the annular shroud member 8, the shroud member being rigidly joined to impeller 3. The impeller is rotatably supported by a roller bearing 9 on a hub 10 which forms a rigid part of the housing 6. Stator 4 is secured rigidly to the end of hub 10. The torque converter is generally conventional in construction and operation, and it will be understood by those skilled in the art that, with fluid properly supplied to the toroidal working circuit defined by the impeller, turbine and stator, rotation of the input shaft 2 and impeller 3 causes rotation of the turbine 5 and output shaft 1.

The drive apparatus also comprises a fluid-operated rotary clutch indicated generally at 12 and including a cylindrical drum 13 which is rigidly secured to a rotary driving or power input member 14. The clutch also includes a second cylindrical drum 15 which surrounds drum 13 and is concentric therewith. The outer drum 15 has secured to its inner surface an inflatable annular clutch member 16 which in turn has secured to its inner periphery a plurality of arcuate friction members 17 arranged in a complete annular series. Drum 15 is fixed to and projects from the peripheral portion 18 of a driven clutch member 19 which includes a hub 20 carried by shaft 2 and keyed or otherwise secured to the shaft so that the combination of elements 2, 19 and 15 rotates as a unit.

Shaft 2 is provided with an axial bore 21 which opens through end face 22 of the shaft and is closed at its opposite end. Shaft 2 is also provided with a radial bore 23 which communicates with bore 21 and opens outwardly. Hub 20 has a radial bore 24, and the relative angular positions of shaft 2 and hub 20 are such that bores 23 and 24 are in direct communication. The peripheral portion 18 of member 19 is in the nature of a ring of rectangular transverse cross section, the ring 18 and hub 20 being interconnected by spokes 25 in such fashion that two parallel side faces of ring 18 lie in planes transverse to the axis of rotation defined by hub 20. Ring 18 is provided with a radial bore 26, which opens through the inner face of the ring and is plugged at its opposite end, and a second bore 27, which is parallel to the axis of rotation of hub 20, communicates with bore 26, and opens through the side face of ring 18 which is directed away from the torque converter. Bore 27 is placed in communication with the interior of inflatable clutch member 16 by a tube 28 and a suitable elbow 29, one end of the elbow extending through drum 15. A tube 30 extends generally radially from hub 20, having one end secured in bore 24 in hub 2 and the other end in bore 26 of ring 18.

Pressure fluid supplied to bore 21 is conducted to the interior of clutch member 16, to inflate the same, via bores 23 and 24, tube 30, bores 26 and 27, tube 28, and elbow 29. As is well known in the art, inflation of clutch member 16 serves to force the friction members 17 inwardly into engagement with drum 13 and, when the pressure and volume of the actuating fluid so supplied are adequately high, the friction members 17 are urged against drum 13 with such force that the resulting frictional engagement provides a direct driving connection, without slippage, between members 13 and 15.

The output or driven shaft 1 has an axial through bore 31 which extends cylindrically for the full length of the shaft and includes successively enlarged right cylindrical portions 32 and 33, FIG. 3. A straight rigid tube 34 extends completely through bore 31, one end 35 of tube 34 being exteriorly threaded and engaged in the threaded end portion of bore 21 in hub 20, so that tube 34 is rigidly connected to hub 20 for rotation therewith and is also in communication with the combination of bores 21 and 23, tube 30, bores 26 and 27, and elbow 29 for supply of pressure fluid to the inflatable clutch member 16. The other end portion 36 of tube 34 is rigidly secured within one end portion of the through bore 37 of a cylindrical adaptor 38.

Adaptor 38 has a portion 39 of an outside diameter significantly smaller than the diameter of bore 31, this portion being disposed inwardly of the bore. The end of tube 34 engages a shoulder 40 in the bore of adaptor 38, so that the adaptor is held in an axially fixed position such that portion 39 is surrounded by portion 32 of bore 31. Roller bearings 41 are engaged between portions 32 and 39 to provide rotational support of tube 34 on shaft 1, the bearings 41 being positioned by a shoulder 42 in bore 31 and a retaining ring 43 snapped into a transverse annular groove in bore portion 32. Adaptor 38 also includes an intermediate portion 44 having an outer diameter only slightly less than the diameter of bore portion 32, and portion 44 is provided with a transverse annular groove accommodating a step seal piston ring 45 which provides a seal between bore portion 32 and intermediate portion 44 and allows some leakage to the space between surface 33 and the surrounding wall presented by shaft 1. This leakage is contained by a lip-type oil seal 33' and is drained to the cavity housing at a point adjacent bearing 52 via ducting 65.

The combination of the threaded connection of end 35 to hub 2, and bearings 39 cooperating with adaptor 38, serves to provide adequate lateral and axial support for tube 34 while preserving complete freedom of relative rotary movement between shaft 1, on the one hand, and hub 2 and tube 34, on the other hand.

The enlarged outer end portion 46 of adaptor 38 is located with bore portion 33. Within end portion 46, the bore 37 of the adaptor is threaded to accommodate the threaded end 47 of one member of a conventional swivel coupling 48. The other member of coupling 48 is connected via elbow 49, FIG. 1, to a pressure fluid supply conduit 50 which extends to a suitable source (not shown) of fluid under pressure.

Housing 6 includes a transverse end wall 51 which carries a roller bearing assembly 52 which rotatably supports the end portion of shaft 1 with which adaptor 38 is associated. Shaft 1 projects beyond end wall 51 and a suitable sprocket or like drive element 53 is secured to the projecting end of the shaft for connecting the drive apparatus to the equipment (not shown) to be driven thereby. Swivel coupling 48 is located beyond the end of shaft 1. The end portion of shaft 1, the swivel coupling 48, and drive element 53 are enclosed by a stationary casing 54 which is secured to wall 51 of housing 6, as by screws 55. Casing 54 includes an end wall 56 having an opening through which conduit 50 extends, a suitable grommet 57 being engaged between wall 56 and conduit 50. Since conduit 50 is fixed in a stationary position and is connected rigidly to the outer member 58 of the swivel coupling 48, outer member 58 is held against rotation. Being fixed to adaptor 38 by reason of the threaded engagement of end portion 47, the other member 59 of swivel coupling 48 is constrained to rotate with the combination of adaptor 38, tube 34 and shaft 2.

Shaft 1 includes an end portion 60 which projects beyond turbine 5 toward shaft 2 and is rotatably supported by a roller bearing 61 carried by an annular member 62 fixed to end flange 63 of shaft 2. Since shaft 2 is supported on the transverse end wall 64 of housing 6 by bearing 7, the combination of flange 63, member 62 and bearing 61 serves to support end portion 60 of shaft 1 rotatably on housing 6.

Though one particularly advantageous embodiment has been shown and described to illustrate the invention, it will be understood that various changes and modifications can be made therein without departing from the scope of the invention as defined in the appended claims.

What is claimed is:

1. In a drive apparatus, the combination of
a torque converter having coaxially aligned rotary driving and driven members;
a rotary clutch comprising
 first and second rotary members, and
 fluid pressure operated means for selectively establishing a driving connection between said first and second members,
 said first member being connectable to a rotary power device and said second member being coupled to said driving member of said torque converter;
conduit means carried by said driving member of said torque converter and extending axially through said driven member,
 said conduit means and said driven member being free for rotary movement relative to each other about the common axis of said driving and driven members of said torque converter;
means providing a fluid passageway in communication with said conduit means and operatively connected to said fluid pressure operated means of said clutch, whereby said clutch can be operated by pressure fluid supplied via said conduit means; and
swivel coupling means connected to said conduit means, whereby pressure fluid from a source exterior to said torque converter can be supplied via said conduit means to operate said clutch.

2. Drive apparatus according to claim 1, wherein
said driven member of said torque converter is an elongated shaft having an axial through bore; and
said conduit means comprises a rigid tube fixed at one end to said driving member and extending coaxially through said through bore,
 the other end of said tube being rotatably supported on said shaft.

3. Drive apparatus according to claim 2, wherein
said torque converter comprises a stationary housing having two parallel walls extending transverse to the common axis of said driving member and said shaft,
 the end portion of said shaft opposite said driving member extending outwardly of said housing beyond one of said walls,
 said driving member having a portion extending outwardly of said housing beyond the other of said walls;
said swivel coupling means being located outside of said housing at the tip of said end portion of said shaft;
said clutch being located outside of said housing adjacent said other wall.

4. Drive apparatus according to claim 3, wherein
said driving member of said torque converter comprises an axial bore,
 said one end of said tube being fixed within the adjacent end of said axial bore of said driving member,
said means providing a fluid passageway being located outside of said housing and communicating with said axial bore of said driving member.

5. Drive apparatus according to claim 2 and further comprising
an adaptor disposed within said through bore of said shaft at the end thereof opposite said driving member,
 said adaptor being secured to said other end of said tube and having a through bore communicating with the interior of said tube;
said swivel coupling means comprising first and second coupling members arranged for rotation relative to each other,
 said first coupling member being rigidly connected to said adaptor in communication with the through bore of said adaptor;
the drive apparatus further comprising anti-friction rotary bearing means disposed between said adaptor and the surrounding portion of said shaft.

6. Drive apparatus according to claim 5 and further comprising
   casing means secured to said one wall of said housing and enclosing said end portion of said shaft and said swivel coupling means,
      said second coupling member of said swivel coupling means being connected to said casing means and thereby restrained against rotation.

References Cited

UNITED STATES PATENTS

| | | | |
|---|---|---|---|
| 3,130,824 | 4/1964 | Anderson | 192—3.3 |
| 3,130,827 | 4/1964 | Beeskow | 192—3.33 X |
| 3,202,018 | 8/1965 | Hilpert | 192—3.33 X |
| 3,265,169 | 8/1966 | Aschauer | 192—3.33 |

MARK NEWMAN, *Primary Examiner.*

ARTHUR T. McKEON, *Examiner.*